United States Patent
Malaure et al.

(10) Patent No.: US 6,806,889 B1
(45) Date of Patent: Oct. 19, 2004

(54) INTERAVTIVE APPLICATIONS

(76) Inventors: Jason Robert Malaure, 33 Shaftesbury Way, Strawberry Hill, Twickenham, Middlesex, TW2 5RN (GB); Richard Andrew Kydd, 64 Popes Avenue, Strawberry Hill, Twickenham, Middlesex, TW2 5TT (GB); Simon Anthony Vivian Cornwell, 11 Eton Road, London, NW3 4SS (GB); John Francis Hamon, The Mount, Nether Hill, Botley, Southampton, Hampshire SO32 2BP (GB); Matthew Edward Tims, Robinwood Cottage, Robinwood Place, Kingston Vale, London SW15 3RN (GB)

( * ) Notice: Subject to any disclaimer, the term of this patent is extended or adjusted under 35 U.S.C. 154(b) by 0 days.

(21) Appl. No.: 09/453,665

(22) Filed: Dec. 3, 1999

(30) Foreign Application Priority Data

Dec. 4, 1998 (EP) .............................. 98309944

(51) Int. Cl.⁷ .............................. G09G 5/00; A63F 13/00
(52) U.S. Cl. ................... 345/733; 345/748; 345/749; 463/40
(58) Field of Search ................... 345/716–718, 345/733, 740, 744, 748, 749, 753, 756, 758; 463/40–43; 725/37–61

(56) References Cited

U.S. PATENT DOCUMENTS

| | | | |
|---|---|---|---|
| 5,630,119 A | * 5/1997 | Aristides et al. ............ 348/906 |
| 5,630,757 A | * 5/1997 | Gagin et al. ................ 463/43 |
| 5,695,400 A | * 12/1997 | Fennell et al. ............. 463/42 |
| 5,838,314 A | 11/1998 | Neel et al. |
| 5,936,661 A | * 8/1999 | Trew ...................... 345/719 |
| 6,014,184 A | * 1/2000 | Knee et al. .............. 348/564 |
| 6,151,626 A | * 11/2000 | Tims et al. ................ 725/1 |
| 6,177,931 B1 | * 1/2001 | Alexander et al. ........ 345/721 |
| 6,287,199 B1 | * 9/2001 | McKeown et al. .......... 463/4 |
| 6,312,336 B1 | * 11/2001 | Handelman et al. ....... 463/1 |
| 6,392,664 B1 | * 5/2002 | White et al. ............. 345/717 |
| 6,446,262 B1 | * 9/2002 | Malaure et al. .......... 725/141 |
| 6,585,590 B2 | * 7/2003 | Malone .................... 463/19 |

FOREIGN PATENT DOCUMENTS

| | | |
|---|---|---|
| EP | 714684 | 6/1996 |
| JP | 000905928 A1 | * 3/1999 |
| WO | 9708892 | 3/1997 |

* cited by examiner

Primary Examiner—Sy D. Luu

(57) ABSTRACT

A method of supplying information from a central source (1) to a plurality of remote user interfaces (9) relating to an interactive application. The method comprises:

i) transmitting application data associated with the interactive application to the user interfaces (9); and, ii) thereafter, transmitting a real time start signal to the user interfaces (9) to enable the interactive application to begin substantially simultaneously at each user interface.

12 Claims, 4 Drawing Sheets

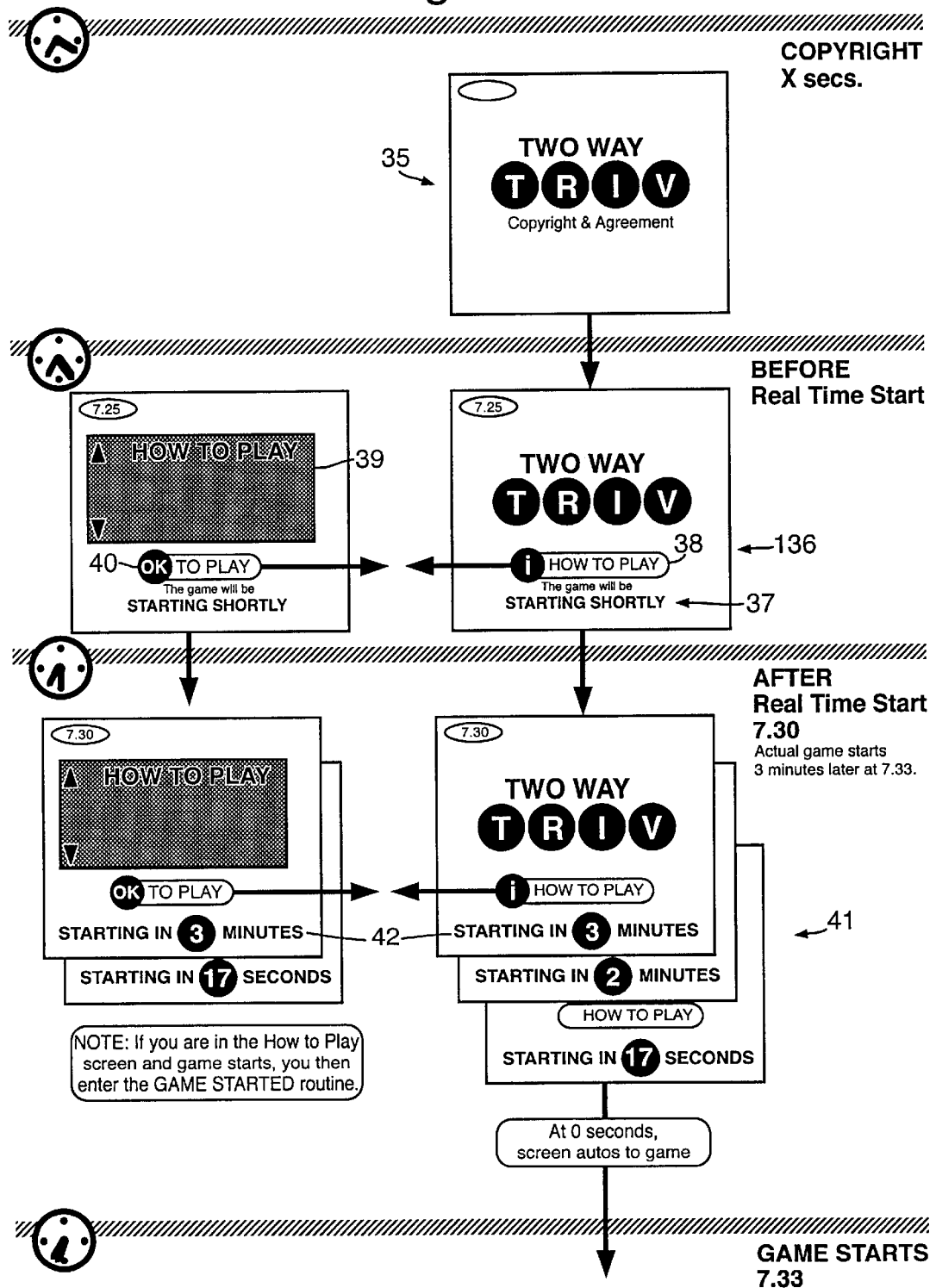

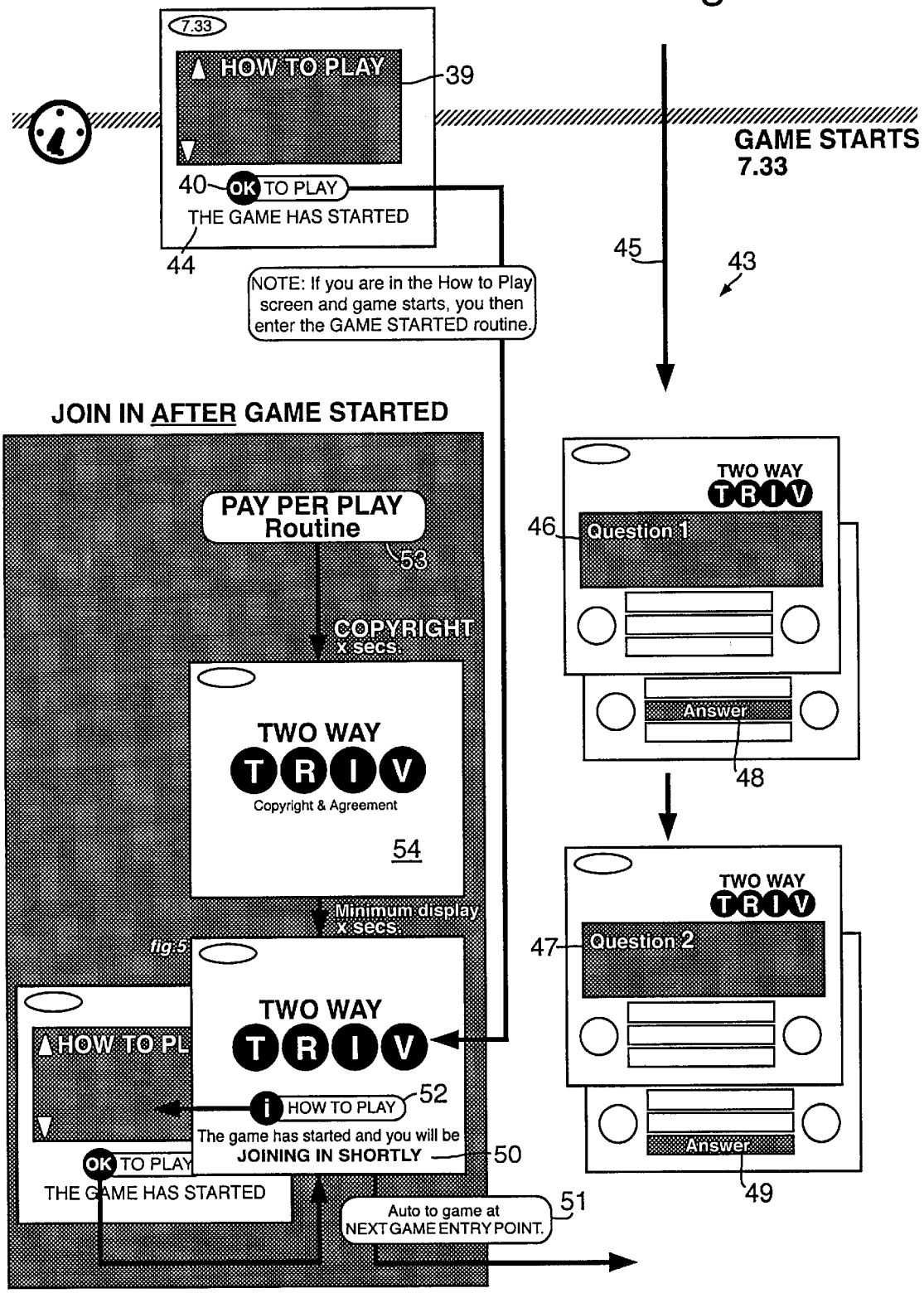

INTERAVTIVE APPLICATIONS

FIELD OF THE INVENTION

The invention relates to a method and apparatus for supplying information from a central source to a plurality of remote user interfaces relating to an interactive application.

DESCRIPTION OF THE PRIOR ART

Interactive applications, such as interactive games, are supplied to a plurality of user interfaces, often in conjunction with a broadcast TV programme or the like with which the application is associated. In a conventional interactive system, a scheduled TV programme is transmitted at a scheduled start time and in addition application data relating to the associated application is also downloaded by the user interfaces.

EP-A-0714684 discloses a real-time multi-user game communication system for use in a cable television infrastructure. Games are transmitted simultaneously to a large number of remote users.

U.S. Pat. No. 5,838,314 discloses an interactive video service system enabling pay-per-view and video-on-demand systems to be implemented. These are not interactive applications and are not therefore directly relevant to the present invention.

In particular, this is not concerned with the simultaneous use of an interactive application by a large number of users.

WO-A-97/08892 describes a system providing interactive entertainment in the form of a branch structured narrative. Information relating to the application is downloaded to a set top box and then the user can activate the application. However, there is no link between different users and so this disclosure is not relevant to the problems addressed by the present invention.

The present invention is concerned with enabling the plurality of remote user interfaces to take part in the same interactive application and thus provide an opportunity for inter-user competition.

A problem with conventional interactive systems is that it can take a large amount of time for each user interface to download the application data. If a user interface starts downloading the application data shortly before the scheduled start time, then there may not be enough time to completely download the application data before the scheduled start time.

SUMMARY OF THE INVENTION

In accordance with a first aspect of the present invention there is provided a method of supplying information from a central source to a plurality of remote user interfaces relating to an interactive application, the method comprising:

i) transmitting application data associated with the interactive application to the user interfaces; and, ii) thereafter, transmitting a real time start signal to the user interfaces to enable the interactive application to begin substantially simultaneously at each user interface.

In accordance with a second aspect of the present invention there is provided apparatus for supplying information from a central source to a plurality of remote user interfaces relating to an interactive application, the apparatus comprising means for:

i) transmitting application data associated with the interactive application to the user interfaces; and, ii) thereafter, transmitting a real time start signal to the user interfaces to enable the interactive application to begin substantially simultaneously at each user interface.

The invention ensures that the application data is transmitted before the application begins by enabling the application at each user interface with a real time start signal. There are various different types of application with which the invention can be implemented. In a simple example, applications can be supplied on demand. In a second group of examples, an interactive application can be scheduled to start at a particular time, for example where the application relates to a game to be played amongst a number of different users. In this situation, the application data will be made available from a predetermined time before the interactive application is scheduled to begin to allow enough time for the data to be downloaded if a user wishes to take part in the interactive application.

In a third group, the interactive application is associated with a TV broadcast programme or the like scheduled to begin at a certain time. As with the previous example, the application data will then be made available from a predetermined time, for example ten minutes before the scheduled program start time.

In all cases, however, the real time start signal must be received before at least the interactive part of the application can commence.

Preferably, the method further comprises broadcasting an "application available" signal at the predetermined time to all the remote user interfaces. This may be as part of an electronic programme guide. Alternatively, the broadcasting of application data may in itself indicate the application is available.

The early knowledge that an application is available allows users to respond before the application starts. This period prior to the issue of the real time start signal can be used to carry out a statistical analysis of the user interfaces. For example the interactive application may comprise a pool betting game in which each user makes a betting payment and the winner of the game receives the betting payments of the other users. In this case, the application may perform certain preliminary tasks, such as passing bets to the central source where the betting payments from all of the user interfaces may be added up and the users informed of the total amount of money which will be given to the winner.

In another example the interactive application may comprise a quiz game in which questions are transmitted to the user interfaces and the users input their answers in response. In this case three different quizzes may be transmitted simultaneously in respective categories—"NOVICE", "INTERMEDIATE" and "ADVANCED". Before the application is started, players enter themselves and provide an indication of their level of expertise to the central source where a check is made that there are at least a minimum number of players entered in each category. If the minimum number of players have not entered in, for example, the "NOVICE" category, then the application is only operated in the "INTERMEDIATE" and "ADVANCED" categories.

Yet a further advantage of the present invention is that it ensures that there is enough time to perform a credit check routine to check the credit of one or more of the users before the application is started.

The application data typically comprises a set of rules and/or executable computer code. The executable program code can then be run as an application by the user interfaces in order to enable the users to interact with the application.

Typically, following the start of the application, a mixture of video data (which may be generated live in a central studio in the form of a television program for example) and/or data (e.g. quiz question data) which provides input for the applications running on the user interfaces will be transmitted to the user interfaces.

The first substantive action in the application may occur after a certain period has passed following the real time start signal. This action could be the appearance of the first question in a quiz game.

The user interfaces may communicate an indication of the time of this action to their respective users during a waiting interval, for instance by a countdown indicating the amount of time remaining or by simultaneously indicating the time of the first action and the current time. These start times may be indicated aurally or by visual display.

The interactive application may be scheduled to start at a certain time and this scheduled start time may be advertised in a TV guide magazine which is supplied to the users in advance. However preferably the method further comprises transmitting electronic programme guide data to the user interfaces, the electronic programme guide data indicating the scheduled start time of the application. Typically, if the first substantive action occurs after the scheduled start time this is not advertised, to discourage users from joining an application at the last moment. In the case of scheduled applications relating to a broadcast programme, the scheduled start times of the programme rather than the application will normally be advertised.

The application data may be repeatedly transmitted over a mass broadcast medium to enable each user interface to download the data when required. Alternatively the application data may be transmitted on receipt of a request from one of the user interfaces.

The user interfaces may all receive the application data via a single common transmission medium or platform. Alternatively, the data may be transmitted on multiple platforms.

BRIEF DESCRIPTION OF THE DRAWINGS

An embodiment of the present invention will now be described with reference to the accompanying drawings, in which:

FIGS. 2 to 4 are a flow diagram illustrating a sequence of images displayed during a scheduled programme.

DESCRIPTION OF THE EMBODIMENTS

Figure 1:
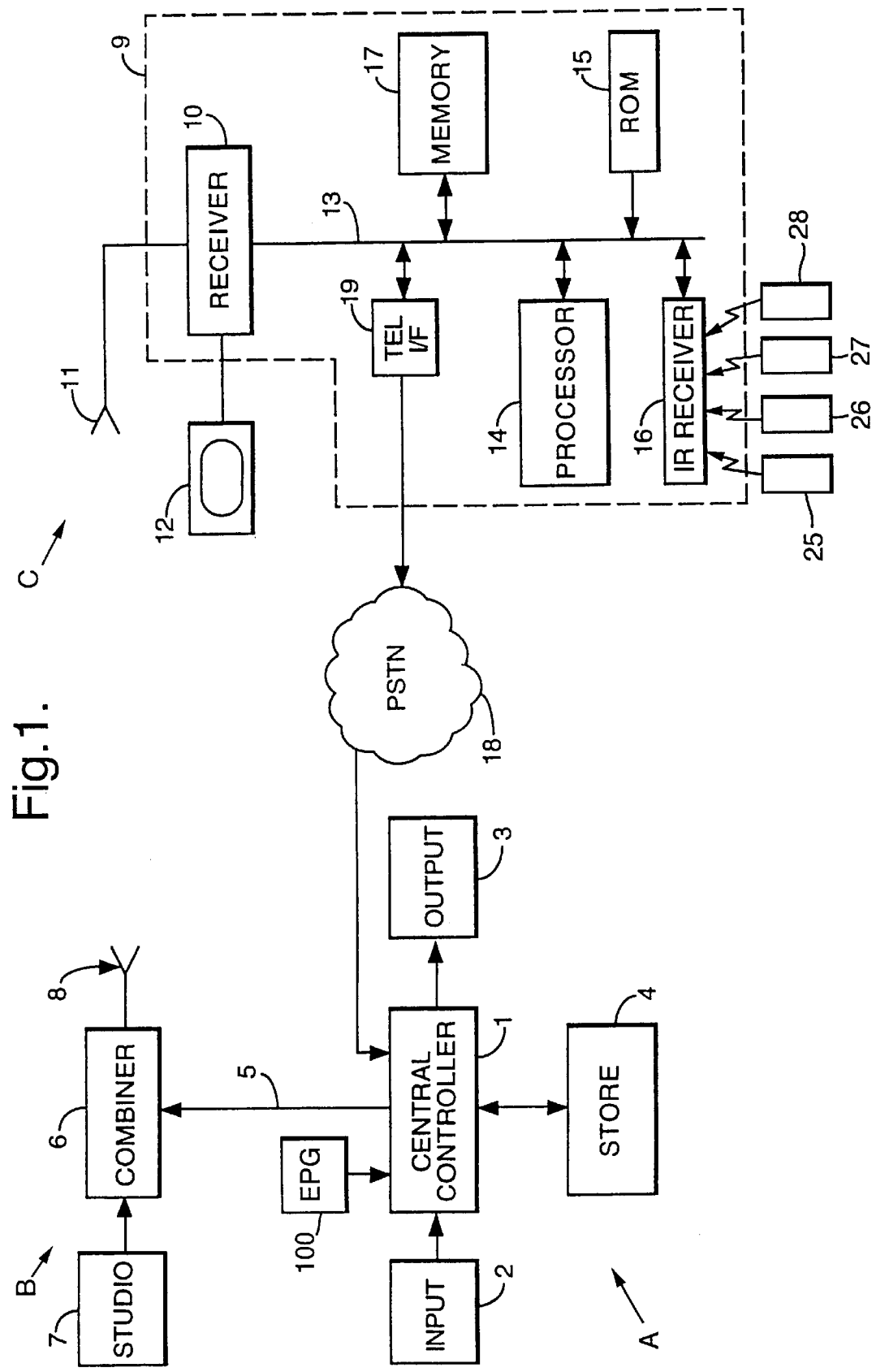
FIG. 1 is a schematic diagram of an interactive broadcast network.

The interactive broadcast network shown in FIG. 1 comprises a game control system A at a central site and including a central controller 1 which will include a computer such as a PC operating a Windows based system, connected to an input device 2 such as a keyboard and/or mouse and the like and to an output device 3 which may include a monitor and/or printer. A store 4 contains a database storing data relating to service functions and remote users, which can be accessed and amended by the central controller 1, and a Live File store storing application data relating to the game (i.e. application) being or to be broadcast. The central controller 1 generates data which can be converted to TV display signals and other control signals associated with various service functions, on a land line 5 connected to a combining unit 6 defining an insertion point of a TV broadcast system B. The combining unit 6 receives television broadcast signals from a studio 7 (or outside broadcast (OB) location, in the case of an outside live event), and combines these with the signals on the line 5 so that they are transmitted simultaneously by a transmitter 8 to remote users or players C. In other applications, the signals from the central controller 1 and the studio or OB 7 will be transmitted separately.

The signals applied to the combiner 6 may be transmitted to the remote units within a vertical blanking interval (VBI) of the normal TV signal or on a separate radio FM-SCA channel or other data format such as a cable modem, or the Internet. Typically, the transmitted signals will be in digital form but the invention is also applicable to analogue signals.

Each remote user C has a home or remote unit 9 forming interface apparatus and implemented as a Set Top Box (STB) having a tunable television receiver 10 connected to an aerial 11 and a monitor 12. The home unit 9 includes an address/databus 13 connected to the receiver 10, the bus 13 being connected to a microprocessor 14, a memory 15, such as a ROM, storing program instructions for the processor 14, an infra-red receiver 16, and a memory (RAM) 17. Signals transmitted by the processor 14 can be communicated to the central controller 1 via a public switched telephone network 18 which is selectively accessed by a telephone interface unit 19 connected to the bus 13.

Alternative media such as cable or the internet can be used for the return signals (as for the signals transmitted to the remote unit C). In general the return signals will be transmitted over a different medium to the incoming signals.

In order to enable the users to communicate with the STB 9, each user has his own handset 25–28 which is physically separate from the STB 9 but can communicate with the IR receiver 16 of the STB 9 via signals generated in the infra-red waveband. The IR receiver 16 then converts those signals for supply to the processor 14 along the data bus 13.

Each remote handset 25–28 can have a variety of control buttons provided as is well known in the art. Each handset can be used to control the channel to which the receiver 10 is tuned, the tuning being effected via the processor 14. In addition, each remote handset 25–28 can be used to control the location of a respective cursor (not shown) displayed on the monitor 12, movement of a button or the like on the remote handset generating signals to which the processor 14 responds by causing equivalent movement of the cursor about the display screen of the monitor 12. A further button is provided to enable the user to "select" an item indicated by the cursor in those applications where this is necessary.

Each handset 25–28 has substantially the same construction which may be of the form described in EP-A-0921657.

The game control system A can be used to control a variety of games including interactive, predictive games and two examples of such interactive, predictive games are described in EP-A-0873772 incorporated herein by reference. In the first example, play live football, the remote players are able to attempt to predict certain events prior to commencement of a live football match which is broadcast by the transmitter 8 and can also attempt to predict certain events during the live broadcast. In the second example, a predictive game for use with broadcast horse racing is described.

The invention is also concerned with games which can be played between participants at the same or different remote locations C. These may be, for example, games based on quiz shows and the like where a question is presented with a set of multiple choice answers and the users at the remote locations C must compete together to be the first to answer correctly from a multiple selection of answers. The questions may or may not be linked to a quiz show being broadcast simultaneously.

An electronic programme guide (EPG) generator 100 provides EPG data to the central computer system 1. The EPG data includes the titles and scheduled start times of scheduled programmes to be broadcast on the interactive channel, and also on other broadcast channels. An example of a conventional electronic programme guide system is described in U.S. Pat. No. 5,630,119.

Figure 2:
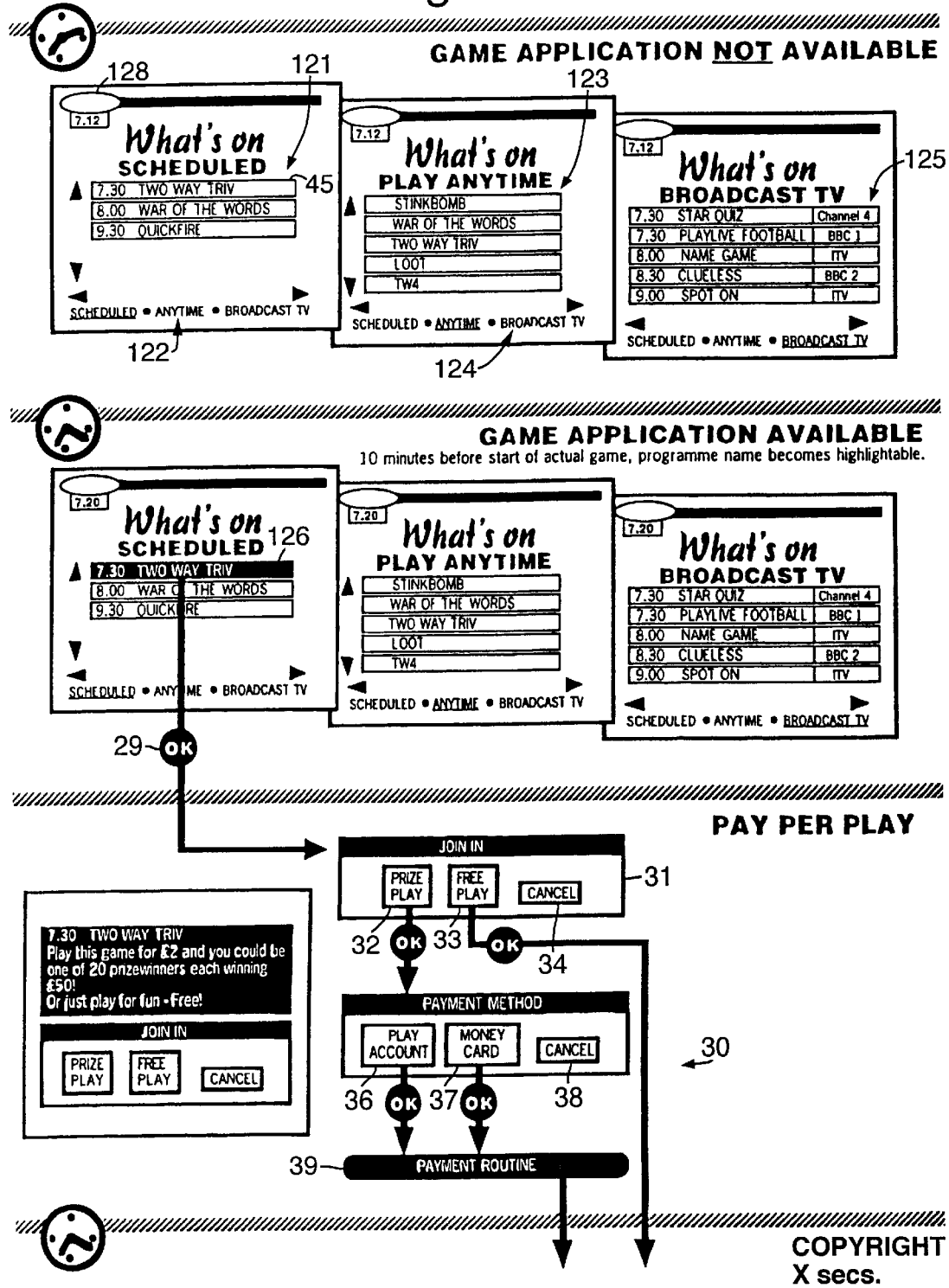

An example of an interactive application will now be described with reference to FIGS. 2–4, which are flow diagrams including a sequence of images which are presented to the user on the monitor 12.

After turning on the STB 9 and tuning the receiver 10 to the interactive channel, the processor 14 obtains information from signals broadcast by the transmitter 8 to cause the monitor 12 to display a list 121 of scheduled programmes along with a clock 128 indicating the current time (in this case 7:12). The list 121 is compiled by the processor 14 from data originating from the EPG generator 100. In this case, a programme entitled "Two Way Triv" is scheduled at a start time of 7:30, "War of the Words" is scheduled at a start time of 8:00, and "Quick Fire" is scheduled at a start time of 9:30. After clicking on an "anytime" icon 122, the processor 14 causes the monitor 12 to display a list 123 of interactive games ("Stinkbomb", "War of the Words" etc.) which can be played at any desired time. By clicking on a "broadcast TV" icon 124 the user is presented in a similar way with a third list 125 of scheduled programmes on broadcast TV. In this case, a programme entitled "Star Quiz" is scheduled at a start time of 7:30 on Channel 4, and a programme entitled "Play Live Football" is scheduled at a start time of 7:30 on BBC 1.

Ten minutes before the scheduled start time of the "Two Way Triv" program (ie. at 7:20), the central controller 1 downloads application data in the form of executable computer code defining a "Two Way Triv" application from the Live File store 4 and also related data such as rule information, and repeatedly broadcasts the data by transmitting it from the transmitter 8. Before 7:20, if the user clicks on the "Two Way Triv" icon 126, the icon is not highlighted indicating that the application data cannot be downloaded. However from 7:20 onwards (i.e. 10 minutes before the scheduled start time), when the user clicks on the icon 126, the processor 14 determines that the "click" time is within a predetermined time (in this case set at 10 minutes) before the scheduled start time of the application corresponding to the icon 126 and thus downloads the "Two Way Triv" application (as indicated at 29) the next time that it is broadcast. The downloaded code is saved in memory 17. In addition, the icon 126 is highlighted by the processor 14.

The processor 14 then runs a preliminary section of the download application which starts with a "pay per play" routine 30 in which the user is first presented with a choice 31 of prize play 32, free play 33 or cancel 34. If the free play icon 32 is selected the routine jumps to a copyright message 35 (shown in FIG. 3) which is held on screen for a predetermined period (X seconds). If the prize play icon 32 is selected, the user is presented with a choice of paying using his play account 36, money card 37, or cancelling 38. If the user clicks on either of the payment icons 36, 37, the processor 14 program jumps to a payment routine 39 in which the user is prompted to enter his play account pin number, or money card (e.g. Mondex) pin number. The play account pin number is transmitted to and stored by the central controller 1 (FIG. 1) via the interface 19 and PSTN 18. The processor 14 then implements a credit check routine and jumps to the copyright message 35 (FIG. 3).

After the copyright message 35 times out (in this case at b 7.25(X=300 seconds)) the program jumps to a "before real time start" routine 136 in which the user is presented with a message 37 "The game will be STARTING SHORTLY". If the user clicks on a "HOW TO PLAY" icon 38, the processor 14 downloads a set of program rules from the store 17, forming part of the previously downloaded application data, which are presented to the user as a list 39. If the user clicks on an "OK TO PLAY" icon 40 the routine returns to message 37.

At the scheduled start time of 7:30 (or when an operator at the central controller 1 decides, for example from a visual cue from a TV program), an operator transmits a real time start signal from the central controller 1 which causes the program to jump to an "after real time start" routine 41 and starts a stream of timed messages transmitted in real time to the processor 14. These messages cause the processor 14 to display a countdown message 42 which indicates the time remaining until the application start time (which may be after the start of a broadcast TV programme with which the application is associated).

It will be appreciated that the real time start signal will be transmitted to all STBs 9 so that all those STBs 9 participating in the application will be synchronized to initiate the application at the same time.

At the application start time of 7:33, the countdown finishes and the application program enters its interactive part starting with an "after game start" routine 43 (FIG. 4). The processor 14 initiates a local counter which provides a value of time elapsed since real-time start (7:33) ("game time"). If the system is in the "how to play" screen at the application start time, then the monitor displays a message 44 "THE GAME HAS STARTED". Otherwise the processor 14 automatically enters a game mode at 45 in which the user is presented with a series of questions 46,47 etc and answers by clicking on selected answer icons 48,49 etc. The questions and answers may fill the entire monitor screen or may be overlaid on a real-time television broadcast, for instance of a presenter reading out the questions to competitors in a television studio.

If the user is in the "how to play" mode at 7.33 then, when the user clicks on the "OK TO PLAY" icon 40, the routine jumps to a display screen which indicates at 50 that the game has started and the user will be joining in shortly. At a game entry point (for instance between questions) the user joins the game at 51. The user is also given the option at 52 of returning to the "how to play" mode.

As shown in FIG. 4, the user may also enter a game after the application start time of 7.33. In this case, at 53 the system carries out the "pay per play" routine (shown at 30 in FIG. 2). The system then displays the copyright message 54 and jumps to the "joining in shortly" display message 50.

We claim:

1. Apparatus for supplying information from a central source to a plurality of remote user interfaces relating to an interactive application, the apparatus comprising:

i) means for transmitting application data to the remote user interfaces, the applications data associated with the interactive application, the interactive application relating to a television program which is broadcast while the interactive application is running;

ii) means for transmitting electronic program guide data to the user interfaces, the electronic program guide data indicating the scheduled start time of the television program; and iii) means for transmitting a real time start signal to the user interfaces to cause the interactive application at each user interface, that selected the interactive application, to begin at the same time after the scheduled start time.

2. User interface apparatus for use with apparatus according to claim 1, the user interface apparatus comprising a processor means for implementing an interactive application and being adapted to be responsive to the receipt of a real time start signal to initiate at least the interactive part of the application.

3. A method of supplying information from a central source to a plurality of remote user interfaces relating to an interactive application, the method comprising:

i. transmitting application data to the remote user interfaces, associated with the interactive application, the interactive application relating to a television program which is broadcast while the interactive application is running;

ii. transmitting electronic program guide data to the user interfaces, the electronic program guide data indicating the scheduled start time of the television program; and iii. transmitting a real time start signal to the user interface, the real time start signal causing the interactive applications to begin at a time after the scheduled start time and at the same time, at each user interface that selected the interactive application.

4. A method according to claim 3, wherein step i) comprises repeatedly transmitting the application data from a predetermined time before the interactive application is to begin.

5. A method according to claim 4, further comprising broadcasting an "application available" signal at the predetermined time to all the remote user interfaces.

6. A method according to claim 5, wherein the "application available" signal is broadcast as part of an electronic program guide.

7. A method according to claim 3, wherein each user interface increments an application time value which is initiated when the application begins.

8. A method according to claim 3, wherein the application data comprises a set of rules associated with the application.

9. A method according to claim 3, wherein the application data comprises executable computer code.

10. A method according to claim 3, wherein the interactive application comprises an interactive game.

11. A method of supplying information from a central source to a plurality of remote user interfaces relating to an interactive application, the method comprising:

i. transmitting application data associated with the interactive application to the user interfaces;

ii. advertising the scheduled start time of the interactive application; and iii. transmitting a real time start signal to the user interfaces, the real time start signal causing the interactive application to begin at a time after the scheduled start time and at the same time, at each user interface that selected the interactive application.

12. A method according to claim 11, wherein the real time start signal defines a time in the future at which the interactive application begins.

* * * * *